United States Patent
Wang et al.

(10) Patent No.: US 9,698,961 B2
(45) Date of Patent: *Jul. 4, 2017

(54) METHOD, BASE STATION, AND USER EQUIPMENT FOR ACTIVATING OR DEACTIVATING CARRIER

(71) Applicant: HUAWEI TECHNOLOGIES CO., LTD., Shenzhen, Guangdong (CN)

(72) Inventors: Fan Wang, Kista (SE); Chuanfeng He, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/198,256

(22) Filed: Jun. 30, 2016

(65) Prior Publication Data

US 2016/0308657 A1    Oct. 20, 2016

Related U.S. Application Data

(63) Continuation of application No. 14/190,953, filed on Feb. 26, 2014, now Pat. No. 9,407,422, which is a (Continued)

(51) Int. Cl.
*H04L 5/00* (2006.01)
*H04W 72/04* (2009.01)

(52) U.S. Cl.
CPC ....... *H04L 5/0098* (2013.01); *H04W 72/0406* (2013.01); *H04W 72/0453* (2013.01); *H04L 5/001* (2013.01); *H04W 72/042* (2013.01)

(58) Field of Classification Search
CPC  H04B 7/26; H04L 1/00; H04L 5/0091; H04L 5/0092; H04L 5/0098; H04L 27/26;
(Continued)

(56) References Cited

U.S. PATENT DOCUMENTS

| 2007/0054681 | A1 | 3/2007 | Suh et al. |
| 2009/0141675 | A1 | 6/2009 | Sebire et al. |

(Continued)

FOREIGN PATENT DOCUMENTS

| CN | 101651850 | 2/2010 |
| CN | 101998523 | 3/2011 |

(Continued)

OTHER PUBLICATIONS

Russian Office Action dated Jan. 11, 2016 in corresponding Russian Patent Application No. 2015115152/07(023662).
(Continued)

Primary Examiner — Andrew Lai
Assistant Examiner — Leon Andrews
(74) Attorney, Agent, or Firm — Staas & Halsey LLP

(57) ABSTRACT

Embodiments of the present invention provide a method, a base station, and a user equipment for activating or deactivating a carrier. The method includes the following: A base station determines to activate or deactivate at least one secondary carrier used to communication with a user equipment and transmits a High Speed Shared Control Channel HS-SCCH order to the user equipment, where the HS-SCCH order carries indication information used to indicate activation or deactivation of the at least one secondary carrier. In the embodiments of the present invention, a user equipment is capable of correctly activating or deactivating a carrier.

10 Claims, 4 Drawing Sheets

A user equipment receives a High Speed Shared Control Channel HS SCCH order transmitted by a base station, where the HS SCCH order carries indication information, the indication information includes at least three bits, the first bit is 0, and the indication information is used to indicate activation or deactivation of at least one secondary carrier for communication between the user equipment and the base station — S201

The user equipment updates an activation or deactivation state of the at least one secondary carrier according to the indication information — S202

Related U.S. Application Data continuation of application No. PCT/CN2012/082168, filed on Sep. 27, 2012.

(58) Field of Classification Search
CPC .... H04L 27/28; H04W 72/04; H04W 72/0406
See application file for complete search history.

(56) References Cited

U.S. PATENT DOCUMENTS

| | | | |
|---|---|---|---|
| 2011/0151828 | A1 | 6/2011 | Gou et al. |
| 2011/0243264 | A1* | 10/2011 | Hultell .................. H04L 5/0092 375/260 |
| 2011/0244806 | A1 | 10/2011 | Gomes et al. |
| 2012/0033631 | A1 | 2/2012 | Dai |

FOREIGN PATENT DOCUMENTS

| | | |
|---|---|---|
| CN | 102131275 | 7/2011 |
| CN | 102158448 | 8/2011 |
| CN | 102624663 | 8/2012 |
| EP | 2584838 | 4/2013 |
| RU | 2396719 C2 | 4/2009 |
| WO | WO2012/009850 | 1/2012 |

OTHER PUBLICATIONS

Notice of Allowance, dated Mar. 30, 2016, in U.S. Appl. No. 14/190,953.
Office Action, dated Jul. 6, 2015, in U.S. Appl. No. 14/190,953.
Extended European Search Report dated Aug. 14, 2014 in corresponding European Patent Application No. 12871610.7.
*Activation/de-activation of secondary HSDPA carriers*, Alcatel-Lucent, Alcatel-Lucent Shanghai Bell, 3GPP TSG-RAN WG1 #60, San Francisco, CA, USA, Feb. 2010, pp. 1-3.
*Activation and deactivation for 8C-HSDPA*, Huawei, HiSilicon, 3GPP TSG RAN WG1 Meeting #64, Taipei, Feb. 2011, 3 pp.
International Search Report and Written Opinion mailed Apr. 4, 2013, in corresponding International Application No. PCT/CN2012/082168.
$3^{rd}$ *Generation Partnership Project; Technical Specification Group Radio Access Network; Multiplexing and channel coding (FDD) (Release 11)*. 3GPP. Sep. 2012. 135 pages.
U.S. Appl. No. 14/190,953, filed Feb. 26, 2014, Fan Wang et al., Huawei Technologies, Co., LTD.
Search Report, dated Jun. 15, 2016, in corresponding Chinese Application No. 2012800013941 (2 pp.).
Office Action, dated Jun. 23, 2016, in corresponding Chinese Application No. 2012800013941 (9 pp.).

* cited by examiner

METHOD, BASE STATION, AND USER EQUIPMENT FOR ACTIVATING OR DEACTIVATING CARRIER

CROSS-REFERENCE TO RELATED APPLICATIONS

This application is a continuation of U.S. patent application Ser. No. 14/190,953, filed on Feb. 26, 2014, now U.S. Pat. No. 9,407,422, issued Aug. 2, 2016, which is a continuation of International Application No. PCT/CN2012/082168, filed on Sep. 27, 2012. The afore-mentioned patent applications are hereby incorporated by reference in their entireties.

TECHNICAL FIELD

Embodiments of the present invention relate to communications technologies, and in particular, to a method and a user equipment for activating or deactivating a carrier.

BACKGROUND

In a wireless communications system, to meet a growing requirement of high-bandwidth high-speed mobile access, the release 9 (Release 9 ) protocol of the 3rd-Generation Partnership Project (the 3rd Generation Partnership Project, 3GPP for short) wideband code division multiple access (Wideband Code Division Multiple Access, WCDMA for short) includes a downlink dual-carrier feature and an uplink dual-carrier feature, that is, downlink transmission using a High-Speed Downlink Shared Channel (High-Speed Downlink Shared Channel, HS-DSCH for short) and uplink transmission using an Enhanced Dedicated Channel (Enhanced Dedicated Channel, E-DCH for short) can be performed simultaneously on two carriers. In R10 and R11, downlink 4-carrier and 8-carrier features are introduced and downlink throughput is further improved.

In a multi-carrier system, an anchor carrier exists among the multiple carriers and other carriers are secondary carriers. The anchor carrier is activated by default and cannot be deactivated, whereas the secondary carriers may be activated or deactivated. In the prior art, a base station may control activation and deactivation of secondary carriers of a user equipment by using a High Speed Shared Control Channel order (High Speed Shared Control Channel order, HS-SCCH order for short) at a physical layer.

However, if a version of a user equipment is inconsistent with a version of a base station serving the user equipment, the user equipment activates or deactivates a carrier in error, thereby affecting uplink and downlink communication of the user equipment.

SUMMARY

Embodiments of the present invention provide a method, a base station, and a user equipment for activating or deactivating a carrier, so that a user equipment correctly activates or deactivates a carrier.

According to a first aspect, an embodiment of the present invention provides a method for activating or deactivating a carrier, including:

determining, by a base station, to activate or deactivate at least one secondary carrier used to communicate with a user equipment; and transmitting, by the base station, a High Speed Shared Control Channel (HS-SCCH) order to the user equipment, where the HS-SCCH order carries indication information, the indication information includes at least three bits, the first bit is 0, and the indication information is used to indicate activation or deactivation of the at least one secondary carrier.

In a first possible implementation manner and according to the first aspect, specific implementation is as follows: the base station is a base station of the R9 version, and the user equipment is a user equipment of the R10 version or the R11 version.

In a second possible implementation manner and according to the first aspect, specific implementation is as follows: at least one bit except the first bit among the at least three bits corresponds to one secondary carrier; a bit corresponding to the secondary carrier is 1, which indicates activation of the secondary carrier, and the bit corresponding to the secondary carrier is 0, which indicates deactivation of the secondary carrier.

In a third possible implementation manner and according to the first aspect or any one of the first and the second possible implementation manners of the first aspect, specific implementation is as follows: the at least one secondary carrier includes at least one secondary uplink carrier or at least one secondary downlink carrier; and if at least two secondary carriers exist, the at least two secondary carriers include at least one secondary uplink carrier and at least one secondary downlink carrier.

According to a second aspect, an embodiment of the present invention further provides a method for activating or deactivating a carrier, including:

receiving, by a user equipment, a High Speed Shared Control Channel HS-SCCH order transmitted by a base station, where the HS-SCCH order carries indication information, the indication information includes at least three bits, the first bit is 0, and the indication information is used to indicate activation or deactivation of at least one secondary carrier for communication between the user equipment and the base station; and updating, by the user equipment, an activation or deactivation state of the at least one secondary carrier according to the indication information.

In a first possible implementation manner and according to the second aspect, specific implementation is as follows: the base station is a base station of the R9 version, and the user equipment is a user equipment of the R10 version or the R11 version.

In a second possible implementation manner and according to the second aspect, specific implementation is as follows: at least one bit except the first bit among the at least three bits corresponds to one secondary carrier; a bit corresponding to the secondary carrier is 1, which indicates activation of the secondary carrier, and the bit corresponding to the secondary carrier is 0, which indicates deactivation of the secondary carrier.

In a third possible implementation manner and according to the second aspect or any one of the first and the second possible implementation manners of the second aspect, specific implementation is as follows: the at least one secondary carrier includes at least one secondary uplink carrier or at least one secondary downlink carrier; and if at least two secondary carriers exist, the at least two secondary carriers include at least one secondary uplink carrier and at least one secondary downlink carrier.

According to a third aspect, an embodiment of the present invention further provides a method for activating or deactivating a carrier, including:

receiving, by a user equipment, a High Speed Shared Control Channel HS-SCCH order transmitted by a base station, where the HS-SCCH order carries indication information, the indication information includes at least three bits, and the indication information is used to indicate activation or deactivation of at least one secondary carrier for communication between the user equipment and the base station; and determining, by the user equipment, the first bit among the at least three bits as 0 and updating an activation or deactivation state of the at least one secondary carrier according to the at least three bits.

In a first possible implementation manner and according to the third aspect, specific implementation is as follows: the first bit among the at least three bits included in the indication information is 0 or 1.

In a second possible implementation manner and according to the third aspect or the first possible implementation manner of the third aspect, specific implementation is as follows: the base station is a base station of the R9 version, and the user equipment is a user equipment of the R10 version or the R11 version.

In a third possible implementation manner and according to the first possible implementation manner of the third aspect, specific implementation is as follows: at least one bit except the first bit among the at least three bits corresponds to one secondary carrier; a bit corresponding to the secondary carrier is 1, which indicates activation of the secondary carrier, and the bit corresponding to the secondary carrier is 0, which indicates deactivation of the secondary carrier.

In a fourth possible implementation manner and according to the third aspect or the first, the second, and the third possible implementation manners of the third aspect, specific implementation is as follows: the at least one secondary carrier includes at least one secondary uplink carrier or at least one secondary downlink carrier; and if at least two secondary carriers exist, the at least two secondary carriers include at least one secondary uplink carrier and at least one secondary downlink carrier.

According to a fourth aspect, an embodiment of the present invention provides a base station, including:

a determining module, configured to determine to activate or deactivate at least one secondary carrier used to communicate with a user equipment; and a transmitting module, configured to transmit a High Speed Shared Control Channel HS-SCCH order to the user equipment, where the HS-SCCH order carries indication information, the indication information includes at least three bits, the first bit is 0, and the indication information is used to indicate activation or deactivation of the at least one secondary carrier.

In a first possible implementation manner and according to the fourth aspect, specific implementation is as follows: the base station is a base station of the R9 version, and the user equipment is a user equipment of the R10 version or the R11 version.

In a second possible implementation manner and according to the fourth aspect, specific implementation is as follows: at least one bit except the first bit among the at least three bits corresponds to one secondary carrier; a bit corresponding to the secondary carrier is 1, which indicates activation of the secondary carrier, and the bit corresponding to the secondary carrier is 0, which indicates deactivation of the secondary carrier.

In a third possible implementation manner and according to the fourth aspect or any one of the first and the second possible implementation manners of the fourth aspect, specific implementation is as follows: the at least one secondary carrier includes at least one secondary uplink carrier or at least one secondary downlink carrier; and if at least two secondary carriers exist, the at least two secondary carriers include at least one secondary uplink carrier and at least one secondary downlink carrier.

According to a fifth aspect, an embodiment of the present invention further provides a user equipment, including:

a receiving module, configured to receive a High Speed Shared Control Channel HS-SCCH order transmitted by a base station, where the HS-SCCH order carries indication information, the indication information includes at least three bits, the first bit is 0, and the indication information is used to indicate activation or deactivation of at least one secondary carrier for communication between the user equipment and the base station; and an updating module, configured to update an activation or deactivation state of the at least one secondary carrier according to the indication information.

In a first possible implementation manner and according to the fifth aspect, specific implementation is as follows: the base station is a base station of the R9 version, and the user equipment is a user equipment of the R10 version or the R11 version.

In a second possible implementation manner and according to the fifth aspect, specific implementation is as follows: at least one bit except the first bit among the at least three bits corresponds to one secondary carrier; a bit corresponding to the secondary carrier is 1, which indicates activation of the secondary carrier, and the bit corresponding to the secondary carrier is 0, which indicates deactivation of the secondary carrier.

In a third possible implementation manner and according to the fifth aspect or any one of the first and the second possible implementation manners of the fifth aspect, specific implementation is as follows: the at least one secondary carrier includes at least one secondary uplink carrier or at least one secondary downlink carrier; and if at least two secondary carriers exist, the at least two secondary carriers include at least one secondary uplink carrier and at least one secondary downlink carrier.

According to a sixth aspect, an embodiment of the present invention further provides a user equipment, including:

a receiving module, configured to receive a High Speed Shared Control Channel HS-SCCH order transmitted by a base station, where the HS-SCCH order carries indication information, the indication information includes at least three bits, and the indication information is used to indicate activation or deactivation of at least one secondary carrier for communication between the user equipment and the base station; and an updating module, configured to determine the first bit among the at least three bits as 0 and updating an activation or deactivation state of the at least one secondary carrier according to the at least three bits.

In a first possible implementation manner and according to the sixth aspect, specific implementation is as follows: the first bit among the at least three bits included in the indication information is 0 or 1.

In a second possible implementation manner and according to the sixth aspect or the first possible implementation manner of the sixth aspect, specific implementation is as follows: the base station is a base station of the R9 version, and the user equipment is a user equipment of the R10 version or the R11 version.

In a third possible implementation manner and according to the first possible implementation manner of the sixth aspect, specific implementation is as follows: at least one bit except the first bit among the at least three bits corresponds to one secondary carrier; a bit corresponding to the secondary carrier is 1, which indicates activation of the secondary carrier, and the bit corresponding to the secondary carrier is 0, which indicates deactivation of the secondary carrier.

In a fourth possible implementation manner and according to the sixth aspect or the first, the second, and the third possible implementation manners of the sixth aspect, specific implementation is as follows: the at least one secondary carrier includes at least one secondary uplink carrier or at least one secondary downlink carrier; and if at least two secondary carriers exist, the at least two secondary carriers include at least one secondary uplink carrier and at least one secondary downlink carrier.

According to a seventh aspect, an embodiment of the present invention provides a base station, including:
- a processor, configured to determine to activate or deactivate at least one secondary carrier used to communicate with a user equipment; and
- a transmitter, configured to transmit a High Speed Shared Control Channel HS-SCCH order to the user equipment, where the HS-SCCH order carries indication information, the indication information includes at least three bits, the first bit is 0, and the indication information is used to indicate activation or deactivation of the at least one secondary carrier.

In a first possible implementation manner and according to the seventh aspect, specific implementation is as follows: the base station is a base station of the R9 version, and the user equipment is a user equipment of the R10 version or the R11 version.

In a second possible implementation manner and according to the seventh aspect, specific implementation is as follows: at least one bit except the first bit among the at least three bits corresponds to one secondary carrier; a bit corresponding to the secondary carrier is 1, which indicates activation of the secondary carrier, and the bit corresponding to the secondary carrier is 0, which indicates deactivation of the secondary carrier.

In a third possible implementation manner and according to the seventh aspect or any one of the first and the second possible implementation manners of the seventh aspect, specific implementation is as follows: the at least one secondary carrier includes at least one secondary uplink carrier or at least one secondary downlink carrier; and if at least two secondary carriers exist, the at least two secondary carriers include at least one secondary uplink carrier and at least one secondary downlink carrier.

According to an eighth aspect, an embodiment of the present invention further provides a user equipment, including:
- a receiver, configured to receive a High Speed Shared Control Channel HS-SCCH order transmitted by a base station, where the HS-SCCH order carries indication information, the indication information includes at least three bits, the first bit is 0, and the indication information is used to indicate activation or deactivation of at least one secondary carrier for communication between the user equipment and the base station; and
- a processor, configured to update an activation or deactivation state of the at least one secondary carrier according to the indication information.

In a first possible implementation manner and according to the eighth aspect, specific implementation is as follows: the base station is a base station of the R9 version, and the user equipment is a user equipment of the R10 version or the R11 version.

In a second possible implementation manner and according to the eighth aspect, specific implementation is as follows: at least one bit except the first bit among the at least three bits corresponds to one secondary carrier; a bit corresponding to the secondary carrier is 1, which indicates activation of the secondary carrier, and the bit corresponding to the secondary carrier is 0, which indicates deactivation of the secondary carrier.

In a third possible implementation manner and according to the eighth aspect or any one of the first and the second possible implementation manners of the eighth aspect, specific implementation is as follows: the at least one secondary carrier includes at least one secondary uplink carrier or at least one secondary downlink carrier; and if at least two secondary carriers exist, the at least two secondary carriers include at least one secondary uplink carrier and at least one secondary downlink carrier.

According to a ninth aspect, an embodiment of the present invention further provides another user equipment, including:
- a receiver, configured to receive a High Speed Shared Control Channel HS-SCCH order transmitted by a base station, where the HS-SCCH order carries indication information, the indication information includes at least three bits, and the indication information is used to indicate activation or deactivation of at least one secondary carrier for communication between the user equipment and the base station; and
- a processor, configured to determine the first bit among the at least three bits as 0 and updating an activation or deactivation state of the at least one secondary carrier according to the at least three bits.

In a first possible implementation manner and according to the ninth aspect, specific implementation is as follows: the first bit among the at least three bits included in the indication information is 0 or 1.

In a second possible implementation manner and according to the ninth aspect or the first possible implementation manner of the ninth aspect, specific implementation is as follows: the base station is a base station of the R9 version, and the user equipment is a user equipment of the R10 version or the R11 version.

In a third possible implementation manner and according to the first possible implementation manner of the ninth aspect, specific implementation is as follows: at least one bit except the first bit among the at least three bits corresponds to one secondary carrier; a bit corresponding to the secondary carrier is 1, which indicates activation of the secondary carrier, and the bit corresponding to the secondary carrier is 0, which indicates deactivation of the secondary carrier.

In a fourth possible implementation manner and according to the ninth aspect or the first, the second, and the third possible implementation manners of the ninth aspect, specific implementation is as follows: the at least one secondary carrier includes at least one secondary uplink carrier or at least one secondary downlink carrier; and if at least two secondary carriers exist, the at least two secondary carriers include at least one secondary uplink carrier and at least one secondary downlink carrier.

According to the method, the base station, and the user equipment for activating or deactivating a carrier that are provided in the embodiments of the present invention, when determining to activate or deactivate at least one secondary carrier used to communicate with a user equipment, a base station transmits a High Speed Shared Control Channel HS-SCCH order to the user equipment, where the HS-SCCH order carries indication information, the indication information includes at least three bits, the first bit is 0, and the indication information is used to indicate activation or deactivation of the at least one secondary carrier; after receiving the HS-SCCH order, the user equipment performs a corresponding operation according to the order. In this way, the UE is capable of performing a correct activation or deactivation operation when a version of the UE is inconsistent with a version of the base station serving the UE, so that the UE performs correct explanation and processing according to the HS-SCCH order, thereby performing normal uplink and downlink communication.

BRIEF DESCRIPTION OF DRAWINGS

To illustrate the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
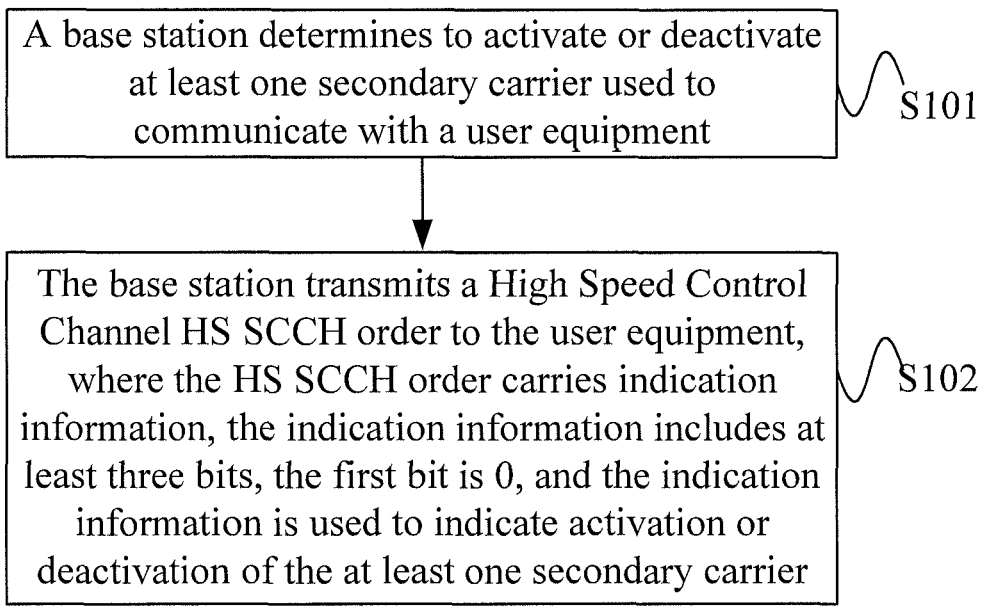
FIG. 1 is a flowchart of a method for activating or deactivating a carrier according to a first embodiment of the present invention.

FIG. 1 is a flowchart of a method for activating or deactivating a carrier according to a first embodiment of the present invention. As shown in FIG. 1, the executor of this embodiment of the present invention is a base station, and the method for activating or deactivating a carrier according to this embodiment of the present invention includes:

S101: The base station determines to activate or deactivate at least one secondary carrier used to communicate with a user equipment.

S102: the base station transmits a High Speed Shared Control Channel HS-SCCH order to the user equipment, where the HS-SCCH order carries indication information, the indication information includes at least three bits, the first bit is 0, and the indication information is used to indicate activation or deactivation of the at least one secondary carrier.

The base station may configure two downlink carriers for the user equipment (User Equipment, UE for short). When a service of the UE has a lower bandwidth requirement, the base station may deactivate at least one secondary carrier, and when the service of the UE has a higher bandwidth requirement, the base station may activate at least one secondary carrier.

When the base station determines to activate or deactivate the at least one secondary carrier used to communicate with the UE, the base station transmits the High Speed Shared Control Channel HS-SCCH order to the UE, where the HS-SCCH order carries the indication information, the indication information includes at least three bits, the first bit is 0, and the indication information is used to indicate activation or deactivation of the at least one secondary carrier. The at least one secondary carrier may generally include at least one secondary uplink carrier or at least one secondary downlink carrier; and if at least two secondary carriers exist, the at least two secondary carriers include at least one secondary uplink carrier and at least one secondary downlink carrier.

After receiving an HS-SCCH order transmitted by a base station of the R9 version, a user equipment of the R10 version or the R11 version updates an activation or deactivation state of a corresponding carrier according to values of order bits xord,1, xord,2, and xord,3 that are carried by the HS-SCCH order. xord,1 is the first bit representing a reserved bit; xord,2 and xord,3 indicate activation or deactivation of a secondary uplink carrier (Secondary uplink frequency) and a secondary downlink carrier (Secondary serving HS-DSCH cell); the first bit xord,1 serving as the reserved bit is set to 0; xord,2 may correspond to the secondary uplink carrier, and xord,3 may correspond to the secondary downlink carrier; values of xord,2 and xord,3 may be 0 and may also be 1; a bit corresponding to xord,2 or xord,3 is 1, which indicates activation of the secondary carrier; the bit corresponding to xord,2 or xord,3 is 0, which indicates deactivation of the secondary carrier; in addition, xord,2, xord,3="10" is a combination not in use.

In a specific embodiment, when a base station of the R9 version transmits an HS-SCCH order to a UE of the R10 or R11 version, the HS-SCCH order may be xord,1=0, xord,2=1, and xord,3=1, that is, xord,1, xord,2, xord,3="011". When the UE of the R10 or R11 version receives the HS-SCCH order, the UE implements activation of a secondary downlink carrier and activation of a secondary uplink carrier and performs a correct operation according to the order, as expected by the base station of the R9 version. When the HS-SCCH order is xord,1=0, xord,2=0, and xord,3=1, that is, xord,1, xord,2, xord,3="001", and the UE of the R10 or R11 version receives the HS-SCCH order, the UE implements activation of a secondary downlink carrier and performs a correct operation according to the order, as expected by the base station of the R9 version.

A person skilled in the art may understand that the R9 version and the R10 or R11 version is specifically a release 9 (Release 9) protocol, a release 10 (Release 10) protocol, or a release 11 (Release 11) protocol of the 3rd generation partnership project (the 3rd Generation Partnership Project, 3GPP for short) wideband code division multiple access (Wideband Code Division Multiple Access, WCDMA for short).

The base station in this embodiment of the present invention determines to activate or deactivate at least one secondary carrier used to communicate with a user equipment, the base station transmits a High Speed Shared Control Channel HS-SCCH order to the user equipment, where the HS-SCCH order carries indication information, the indication information includes at least three bits, the first bit is 0, and the indication information is used to indicate activation or deactivation of the at least one secondary carrier. After receiving the HS-SCCH order, the UE performs a corresponding operation according to the order. In this way, the UE is capable of performing a correct activation or deactivation operation when a version of the UE is inconsistent with a version of the base station serving the UE, so that the UE performs correct explanation and processing according to the HS-SCCH order, thereby performing normal uplink and downlink communication.

The following uses a specific embodiment as an example to describe the present invention in detail.

In a specific implementation process, when a base station determines to activate or deactivate at least one secondary carrier used to communicate with a UE, the base station transmits a High Speed Shared Channel HS-SCCH order to the UE, where the HS-SCCH order carries indication information that may indicate activation or deactivation of the at least one secondary carrier. Specifically, a format of the HS-SCCH order is formed by an order type and an order bit, as listed in Table 1. When the base station is of the R9 version, three order bits (order bits) corresponding to the order type (order type) "001" of the HS-SCCH order are $x_{ord,1}$, $x_{ord,2}$, and $x_{ord,3}$. The indication message carried in the HS-SCCH order may be values of $x_{ord,1}$, $x_{ord,2}$, and $x_{ord,3}$. As can be seen from Table 1, when an order mapping value of the three order bits (order bits) $x_{ord,1}$, $x_{ord,2}$, and $x_{ord,3}$ that correspond to "001" is "001", it indicates a function of activation of a secondary downlink carrier; when the order mapping value of the three order bits (order bits)

$x_{ord,1}$, $x_{ord,2}$, and $x_{ord,3}$ that correspond to "001" is "011", it indicates functions of activation of a secondary downlink carrier and activation of a secondary uplink carrier.

TABLE 1

| Order Type (order type) | Order Mapping (Order Mapping) | | | Functionality |
|---|---|---|---|---|
| $X_{odt,1}, X_{odt,2}, X_{odt,3}$ | $X_{ord,1}$ | $X_{ord,2}$ | $X_{ord,3}$ | (Functionality) |
| 001 | 0 | x | 1 | Activation of a secondary downlink carrier |
| | 0 | x | 0 | Deactivation of a secondary downlink carrier |
| | 0 | 1 | x | Activation of a secondary uplink carrier |
| | 0 | 0 | x | Deactivation of a secondary uplink carrier |

In the 3GPP R10 or R11 version, a format of an HS-SCCH order for activating or deactivating multiple downlink and uplink carriers is further designed for features of 4 Carrier-High Speed Downlink Packet Access (4 Carrier-High Speed Downlink Packet Access, 4C-HSDPA for short) and High Speed Uplink Packet Access (Dual Cell-high speed uplink packet access, DC-HSUPA for short), as shown in Table 2. Different from the dual-carrier activation or deactivation signaling in the R9 version, one HS-SCCH order combination is used to indicate each allowed combination of activation or deactivation states of uplink and downlink carriers, each HS-SCCH order combination is indicated by different values of 6 bits in order type and order bit fields in the combination, and conversion between combinations of activation or deactivation states of secondary uplink and downlink carriers is implemented by using different HS-SCCH order combinations. A indicates carrier activation (Activate), D indicates carrier deactivation (De-activate), a reserved value indicates a combination not in use at present and does not represent other meanings.

TABLE 2

| Order Type (order type) | Order Mapping (Order Mapping) | | | Functionality (Functionality) A = Activate; D = Deactivate | | | |
|---|---|---|---|---|---|---|---|
| | | | | 1st secondary downlink | 2nd secondary downlink | 3rd secondary downlink | Secondary uplink |
| $X_{odt,1}, X_{odt,2}, X_{odt,3}$ | $X_{ord,1}$ | $X_{ord,2}$ | $X_{ord,3}$ | carrier | carrier | carrier | carrier |
| 001 | 0 | 0 | 0 | D | D | D | D |
| | 0 | 0 | 1 | A | D | D | D |
| | 0 | 1 | 1 | A | D | D | A |
| | 0 | 1 | 0 | D | A | D | D |
| | 1 | 0 | 0 | A | A | D | D |
| | 1 | 0 | 1 | A | A | D | A |
| | 1 | 1 | 0 | D | D | A | D |
| | 1 | 1 | 1 | A | D | A | D |
| 010 | 0 | 0 | 0 | A | D | A | A |
| | 0 | 0 | 1 | D | A | A | D |
| | 0 | 1 | 0 | A | A | A | D |
| | 0 | 1 | 1 | A | A | A | A |
| | 1 | 0 | 0 | Reserved | | | |
| | 1 | 0 | 1 | Reserved | | | |
| | 1 | 1 | 0 | Reserved | | | |
| | 1 | 1 | 1 | Reserved | | | |

Refer to Table 1 and Table 2, when $x_{ord,1}=0$, in Table 1, $x_{ord,1}, x_{ord,2}, x_{ord,3}=$"000", "001", and "011" indicate deactivation of secondary uplink and downlink carriers, activation of a secondary downlink carrier and deactivation of a secondary uplink carrier, and activation of secondary uplink and downlink carriers, respectively. As can be seen from Table 1 and Table 2, the HS-SCCH order defined in the R9 version uses a bit value to indicate an activation or deactivation state of a carrier, whereas the HS-SCCH order defined in the R10 version uses a bit combination to indicate activation or deactivation states of all secondary carriers, and the bit combination is a combination of an order type and an order mapping. In addition, the secondary downlink carrier in Table 1 is equivalent to the $1^{st}$ secondary downlink carrier in Table 2.

A base station of the R9 version transmits an HS-SCCH order to a UE of the R10 or R11 version following the illustration in Table 1, and after receiving the HS-SCCH order, the UE of the R10 or R11 version updates an activation or deactivation state of the $1^{st}$ secondary downlink carrier and/or the secondary uplink carrier according to the HS-SCCH order and Table 2. Because the secondary downlink carrier in the R9 version is equivalent to the $1^{st}$ secondary downlink carrier in the R10 or R11 version, as can be seen from Table 1 and Table 2, when the first bit $x_{ord,1}$ in the R9 version is 0, the UE of the R10 or R11 version performs a carrier update according to $x_{ord,1}$, $x_{ord,2}$, $x_{ord,3}$="000", "001", and "011", and the result of the update is the same as an expectation of the base station of the R9 version on activation or deactivation of a secondary uplink carrier and a secondary downlink carrier of the UE. When the first bit $x_{ord,1}$ in the R9 version is 1, the UE of the R10 or R11 version performs a carrier update according to $x_{ord,1}$, $x_{ord,2}$, $x_{ord,3}$="100", "101", and "111", which is different from the expectation of the base station of the R9 version on activation or deactivation of a secondary uplink carrier and a secondary downlink carrier.

In this embodiment of the present invention, a base station transmits a High Speed Shared Control Channel HS-SCCH order to a user equipment, where the HS-SCCH order carries indication information, the indication information includes at least three bits, the first bit is 0, and the indication message is used to indicate activation or deactivation of the at least one secondary carrier; after receiving the HS-SCCH order, the UE performs a corresponding operation according to the order. In this way, the UE is capable of performing a correct activation or deactivation operation when a version of the UE is inconsistent with a version of the base station serving the UE, so that the UE performs correct explanation and processing according to the HS-SCCH order, thereby performing normal uplink and downlink communication.

Figure 2:
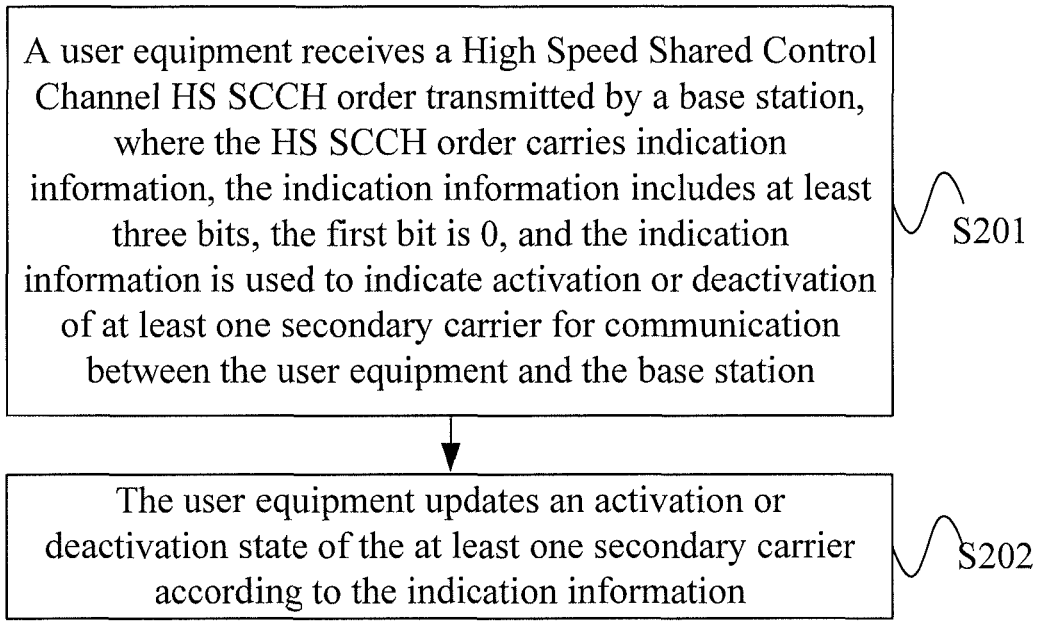
FIG. 2 is a flowchart of a method for activating or deactivating a carrier according to a second embodiment of the present invention.

FIG. 2 is a flowchart of a method for activating or deactivating a carrier according to a second embodiment of the present invention. As shown in FIG. 2, the executor of this embodiment of the present invention is a user equipment, and the method for activating or deactivating a carrier according to this embodiment of the present invention includes:

S201: A user equipment receives a High Speed Shared Control Channel HS-SCCH order transmitted by a base station, where the HS-SCCH order carries indication information, the indication information includes at least three bits, the first bit is 0, and the indication information is used to indicate activation or deactivation of at least one secondary carrier for communication between the user equipment and the base station.

S202: the user equipment updates an activation or deactivation state of the at least one secondary carrier according to the indication information.

When the base station determines to activate or deactivate the at least one secondary carrier used to communicate with the UE, the base station transmits the High Speed Shared Channel HS-SCCH order to the UE, where the HS-SCCH order carries the indication information, the indication information includes at least three bits, the first bit is 0, and the indication information is used to indicate activation or deactivation of the at least one secondary carrier.

After receiving the HS-SCCH order transmitted by the base station, a user equipment of the R10 version or the R11 version updates an activation or deactivation state of a corresponding carrier according to values of $x_{ord,1}$, $x_{ord,2}$, and $x_{ord,3}$ that are carried in the indication information in the HS-SCCH order. $x_{ord,1}$ is the first bit representing a reserved bit; $x_{ord,2}$ and $x_{ord,3}$ indicate activation or deactivation of a secondary uplink carrier (Secondary uplink frequency) and a secondary downlink carrier (Secondary serving HS-DSCH cell); the first bit $x_{ord,1}$ serving as the reserved bit is set to 0; $x_{ord,2}$ may correspond to the secondary uplink carrier, and $x_{ord,3}$ may correspond to the secondary downlink carrier; values of $x_{ord,2}$ and $x_{ord,3}$ may be 0 and may also be 1 a bit corresponding to $x_{ord,2}$ or $x_{ord,3}$ is 1, which indicates activation of the secondary carrier; the bit corresponding to $x_{ord,2}$ or $x_{ord,3}$ is 0, which indicates deactivation of the secondary carrier; in addition, $x_{ord,2}$, $x_{ord,3}$="10" is a combination not in use.

In a specific embodiment, when a base station of the R9 version transmits an HS-SCCH order to a UE of the R10 or R11 version, the HS-SCCH order may be $x_{ord,1}$=0, $x_{ord,2}$=1, and $x_{ord,3}$=1, that is, $x_{ord,1}$, $x_{ord,2}$, $x_{ord,3}$"011". When the UE of the R10 or R11 version receives the HS-SCCH order, the UE implements activation of a secondary downlink carrier and activation of a secondary uplink carrier and performs a correct operation according to the order, as expected by the base station of the R9 version.

When the HS-SCCH order is $x_{ord,1}$=0, $x_{ord,2}$=0, and $x_{ord,3}$=1, that is, $x_{ord,1}$, $x_{ord,2}$, $x_{ord,3}$="001", and the UE of the R10 or R11 version receives the HS-SCCH order, the UE implements activation of a secondary downlink carrier and performs a correct operation according to the order, as expected by the base station of the R9 version.

In this embodiment of the present invention, a user equipment receives a High Speed Shared Control Channel HS-SCCH order transmitted by a base station, where the HS-SCCH order carries indication information; the user equipment updates an activation or deactivation state of at least one secondary carrier according to the indication information. In this way, the UE is capable of performing a correct activation or deactivation operation when a version of the UE is inconsistent with a version of the base station serving the UE, so that the UE performs correct explanation and processing according to the HS-SCCH order, thereby performing normal uplink and downlink communication.

The following uses a specific embodiment as an example to describe the present invention in detail.

In the R9 version, the first bit $x_{ord,1}$ serving as the reserved bit is set to 0; $x_{ord,2}$ may correspond to the secondary uplink carrier, and $x_{ord,3}$ may correspond to the secondary downlink carrier; values of $x_{ord,2}$ and $x_{ord,3}$ may be 0 and may also be 1; a bit corresponding to $x_{ord,2}$ or $x_{ord,3}$ is 1, which indicates activation of the secondary carrier; and the bit corresponding to $x_{ord,2}$ or $x_{ord,3}$ is 0, which indicates deactivation of the secondary carrier. The secondary downlink carrier in the R9 version is equivalent to the $1^{st}$ secondary downlink carrier in the R10 or R11 version, a base station of the R9 version transmits an HS-SCCH order to a UE of the R10 or R11 version according to Table 1, and the UE of the R10 or R11 version receives the HS-SCCH order and updates an activation or deactivation state of the $1^{st}$ secondary downlink carrier and/or the secondary uplink carrier according to the HS-SCCH order and Table 2. As can be seen from Table 1 and Table 2, when the first bit $x_{ord,1}$ in the R9 version is 0, the UE of the R10 or R11 version performs a carrier update according to $x_{ord,1}$, $x_{ord,2}$, $x_{ord,3}$="000", "001", and "011", and the result of the update is the same as an expectation of the base station of the R9 version on activation or deactivation of a secondary uplink carrier and a secondary downlink carrier of the UE. When the first bit $x_{ord,1}$ in the R9 version is 1, the UE of the R10 or R11 version performs a carrier update according to $x_{ord,1}$, $x_{ord,2}$, $x_{ord,3}$="100", "101", and "111", which is different from the expectation of the base station of the R9 version on activation or deactivation of a secondary uplink carrier and a secondary downlink carrier of the UE.

In this embodiment of the present invention, a user equipment receives a High Speed Shared Control Channel HS-SCCH order transmitted by a base station, where the HS-SCCH order carries indication information; the user equipment updates an activation or deactivation state of at least one secondary carrier according to the indication information. In this way, the UE is capable of performing a correct activation or deactivation operation when a version of the UE is inconsistent with a version of the base station serving the UE, so that the UE performs correct explanation and performs correct processing on a secondary uplink carrier and a secondary downlink carrier according to the HS-SCCH order, thereby performing normal uplink and downlink communication.

Figure 3:
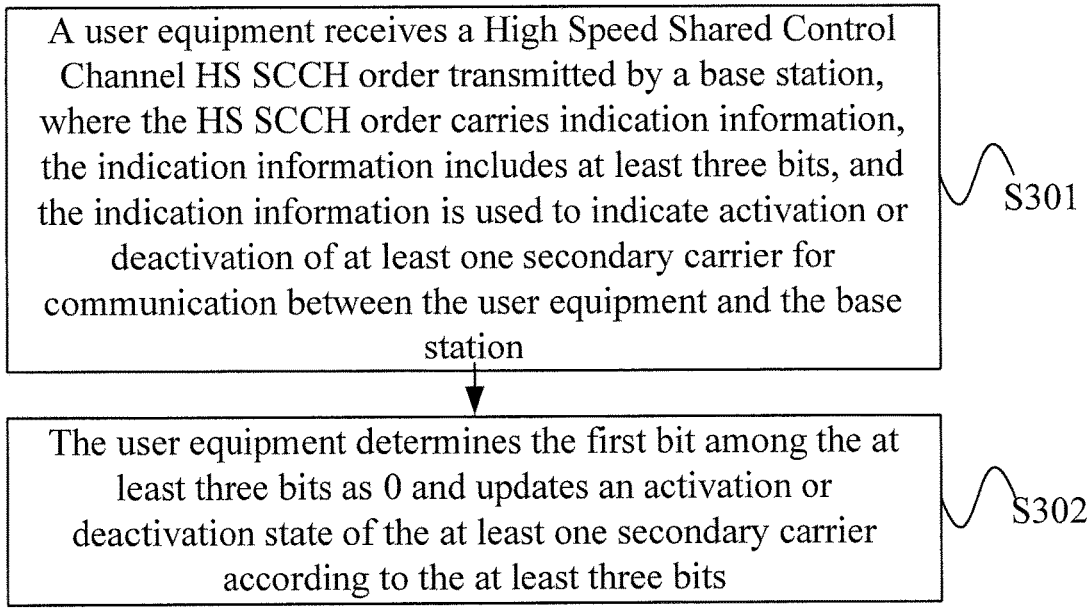
FIG. 3 is a flowchart of a method for activating or deactivating a carrier according to a third embodiment of the present invention.

FIG. 3 is a flowchart of a method for activating or deactivating a carrier according to a third embodiment of the present invention. As shown in FIG. 3, the executor of this embodiment of the present invention is a user equipment, and the method for activating or deactivating a carrier according to this embodiment of the present invention includes:

S301: The user equipment receives a High Speed Shared Control Channel HS-SCCH order transmitted by a base station, where the HS-SCCH order carries indication information, the indication information includes at least three bits, and the indication information is used to indicate activation or deactivation of at least one secondary carrier for communication between the user equipment and the base station.

S302: The user equipment determines the first bit among the at least three bits as 0 and updates an activation or deactivation state of the at least one secondary carrier according to the at least three bits.

The base station configures two downlink carriers for the user equipment (User Equipment, UE for short). When a service of the UE has a lower bandwidth requirement, the base station may deactivate at least one secondary carrier, and when the service of the UE has a higher bandwidth requirement, the base station may activate at least one secondary carrier.

When the base station determines to activate or deactivate the at least one secondary carrier used to communicate with the UE, the base station transmits the High Speed Shared Channel HS-SCCH order to the UE, and the UE receives the HS-SCCH order, where the HS-SCCH order carries the indication information, the indication information includes at least three bits, and the indication information is used to indicate activation or deactivation of the at least one secondary carrier. A value of the first bit $x_{ord,1}$ may be 0 and may also be 1.

Because the value of the first bit $x_{ord,1}$ received by the UE may be 0 and may also be 1, the UE determines the first bit among the at least three bits as 0 and updates the activation or deactivation state of the at least one secondary carrier according to the three bits, so that the UE is capable of performing a correct activation or deactivation operation when a version of the UE is inconsistent with a version of the base station serving the UE.

In this embodiment of the present invention, a user equipment receives a High Speed Shared Control Channel HS-SCCH order transmitted by a base station, where the HS-SCCH order carries indication information, and the indication information includes at least three bits; the user equipment determines the first bit among the at least three bits as 0 and updates an activation or deactivation state of at least one secondary carrier according to the at least three bits. In this way, the UE is capable of performing a correct activation or deactivation operation when a version of the UE is inconsistent with a version of the base station serving the UE, so that the UE performs correct explanation and processing according to the HS-SCCH order, thereby performing normal uplink and downlink communication.

The following uses a specific embodiment as an example to describe the present invention in detail.

In a specific implementation process, when a base station determines to activate or deactivate at least one secondary carrier used to communicate with a UE, the base station transmits a High Speed Shared Channel HS-SCCH order to the UE, and the UE receives the HS-SCCH order, where the HS-SCCH order carries indication information that may indicate activation or deactivation of the at least one secondary carrier. When the base station is of the R9 version, $x_{ord,2}$ and $x_{ord,3}$ among three order bits (order bits) corresponding to the order type order type "001" in the HS-SCCH order indicate activate or deactivation of a secondary uplink carrier (Secondary uplink frequency) and a secondary downlink carrier (Secondary serving HS-DSCH cell), and $x_{ord,1}$ is a reserved bit. The indication message carried in the HS-SCCH order may be values of $x_{ord,1}$, $x_{ord,2}$, and $x_{ord,3}$, where the value of the first bit $x_{ord,1}$ serving as the reserved bit may be different from the value of the reserved bit $x_{ord,1}$ in Table 1. In Table 1, $x_{ord,1}$ is set to 0, whereas in this situation, the value of $x_{ord,1}$ may be 0 or 1, and $x_{ord,1}$ serves as the reserved bit representing no meaning. In addition, $x_{ord,2}$ may correspond to the secondary uplink carrier, $x_{ord,3}$ may correspond to the secondary downlink carrier, and values of $x_{ord,2}$ and $x_{ord,3}$ may be 0 and may also be 1, where 1 indicates that the secondary carrier is activated, and 0 indicates that the secondary carrier is deactivated.

The secondary downlink carrier in the R9 version is equivalent to the $1^{st}$ secondary downlink carrier in the R10 or R11 version; when a UE of the R10 or R11 version receives the HS-SCCH order of the R9 version, the UE determines the first bit $x_{ord,1}$ among the at least three bits as 0 no matter whether the value of the first bit $x_{ord,1}$ serving as the reserved bit is 1 or 0, explains the order bits according to the HS-SCCH order and Table 2, and updates an activate or deactivation state of the $1^{st}$ secondary downlink carrier and/or the secondary uplink carrier, which is the same as an expectation of the base station of the R9 version on activation or deactivation the secondary uplink carrier and/or the secondary downlink carrier. For example, when the UE of the R10 or R11 version receives the HS-SCCH order transmitted by the base station of the R9 version and $x_{ord,1}$, $x_{ord,2}$, $x_{ord,3}$="111", the UE determines the value "1" of the first bit $x_{ord,1}$ in the order as "0", that is, the UE determines that $x_{ord,1}$, $x_{ord,2}$, $x_{ord,3}$="011", and activates the $1^{st}$ secondary downlink carrier and the secondary uplink carrier following the illustration in Table 2 rather than activating the secondary downlink carrier and deactivating the secondary uplink carrier, so that an activation or deactivation state of a carrier is the same as an expectation of the base station of the R9 version on the UE.

In this embodiment of the present invention, a user equipment receives a High Speed Shared Control Channel HS-SCCH order transmitted by a base station, where the HS-SCCH order carries indication information, and the indication information includes at least three bits; the user equipment determines the first bit among the at least three bits as 0 and updates an activation or deactivation state of the $1^{st}$ secondary downlink carrier and/or an uplink carrier according to the at least three bits. In this way, the UE is capable of performing a correct activation or deactivation operation when a version of the UE is inconsistent with a version of the base station serving the UE, so that the UE performs correct explanation and processing according to the HS-SCCH order, thereby performing normal uplink and downlink communication.

Figure 4:
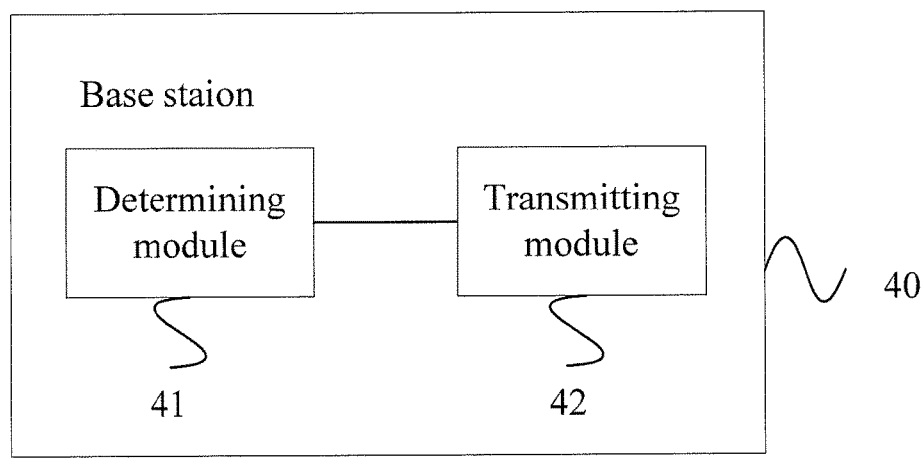
FIG. 4 is a schematic structural diagram of a base station according to a first embodiment of the present invention.

FIG. 4 is a schematic structural diagram of a base station according to a first embodiment of the present invention. As shown in FIG. 4, the base station 40 in this embodiment of the present invention includes a determining module 41 and a transmitting module 42. The determining module 41 is configured to determine to activate or deactivate at least one secondary carrier used to communicate with a user equipment; the transmitting module 42 is configured to transmit a High Speed Shared Control Channel HS-SCCH order to the user equipment, where the HS-SCCH order carries indication information, the indication information includes at least three bits, the first bit is 0, and the indication information is used to indicate activation or deactivation of the at least one secondary carrier.

The base station in this embodiment may be used to perform the technical solution in the method embodiment illustrated in FIG. 1, their implementation principles and technical effects are similar, and therefore not further details are provided herein.

Optionally, the base station is a base station of the R9 version, and the user equipment is a user equipment of the R10 version or the R11 version.

Optionally, at least one bit except the first bit among the at least three bits corresponds to one secondary carrier; a bit corresponding to the secondary carrier is 1, which indicates activation of the secondary carrier, and the bit corresponding to the secondary carrier is 0, which indicates deactivation of the secondary carrier.

Optionally, the at least one secondary carrier includes at least one secondary uplink carrier or at least one secondary downlink carrier; and if at least two secondary carriers exist, the at least two secondary carriers include at least one secondary uplink carrier and at least one secondary downlink carrier.

The base station in this embodiment may be used to perform the technical solution in the method embodiment, their implementation principles and technical effects are similar, and therefore not further details are provided herein.

Figure 5:
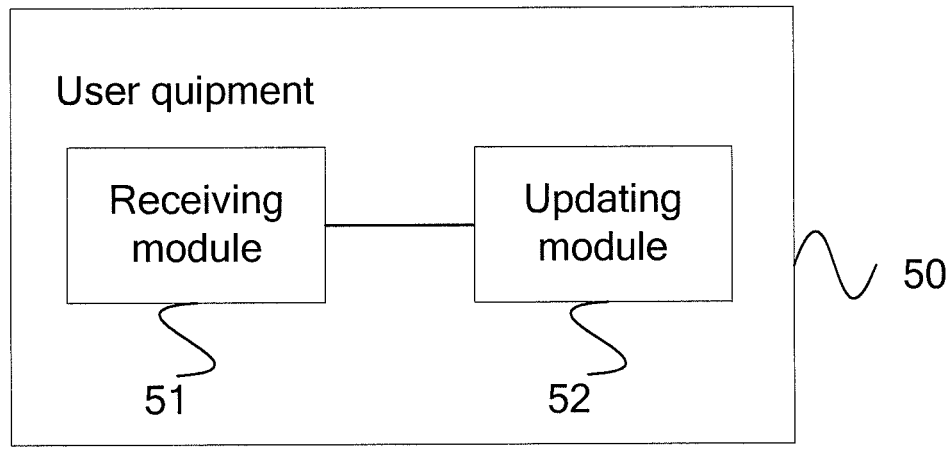
FIG. 5 is a schematic structural diagram of a user equipment according to a first embodiment of the present invention.

FIG. 5 is a schematic structural diagram of a user equipment according to a first embodiment of the present invention. As shown in FIG. 5, the user equipment 50 in this embodiment of the present invention includes a receiving module 51 and an updating module 52. The receiving module 51 is configured to receive a High Speed Shared Control Channel HS-SCCH order transmitted by a base station, where the HS-SCCH order carries indication information, the indication information includes at least three bits, the first bit is 0, and the indication information is used to indicate activation or deactivation of at least one secondary carrier for communication between the user equipment and the base station; the updating module 52 is configured to update an activation or deactivation state of the at least one secondary carrier according to the indication information.

The user equipment in this embodiment may be used to perform the technical solution in the method embodiment illustrated in FIG. 2, their implementation principles and technical effects are similar, and therefore not further details are provided herein.

Optionally, the base station is a base station of the R9 version, and the user equipment is a user equipment of the R10 version or the R11 version.

Optionally, at least one bit except the first bit among the at least three bits corresponds to one secondary carrier; a bit corresponding to the secondary carrier is 1, which indicates activation of the secondary carrier, and the bit corresponding to the secondary carrier is 0, which indicates deactivation of the secondary carrier.

Optionally, the at least one secondary carrier includes at least one secondary uplink carrier or at least one secondary downlink carrier; and if at least two secondary carriers exist, the at least two secondary carriers include at least one secondary uplink carrier and at least one secondary downlink carrier.

The user equipment in this embodiment may be used to perform the technical solution in the method embodiment, their implementation principles and technical effects are similar, and therefore not further details are provided herein.

Figure 6:
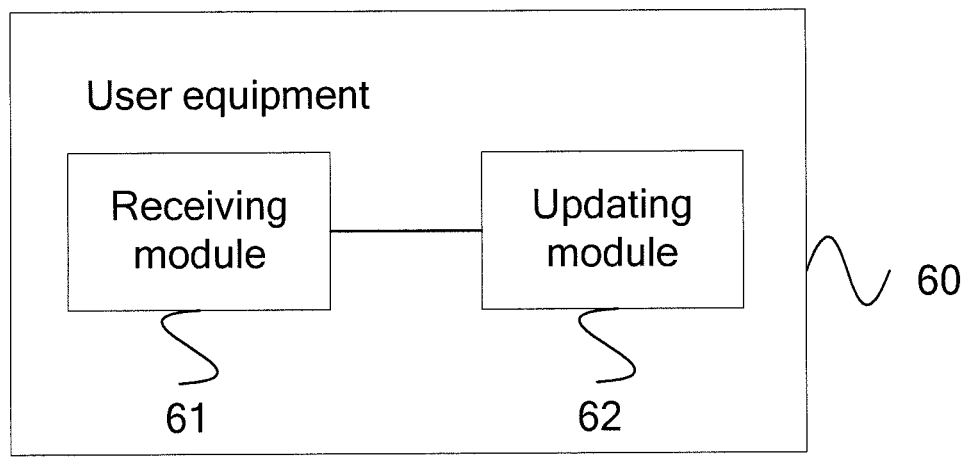
FIG. 6 is a schematic structural diagram of a user equipment according to a second embodiment of the present invention.

FIG. 6 is a schematic structural diagram of a user equipment according to a second embodiment of the present invention. As shown in FIG. 6, the user equipment 60 in this embodiment of the present invention includes a receiving module 61 and an updating module 62. The receiving module 61 is configured to receive a High Speed Shared Control Channel HS-SCCH order transmitted by a base station, where the HS-SCCH order carries indication information, the indication information includes at least three bits, and the indication information is used to indicate activation or deactivation of at least one secondary carrier for communication between the user equipment and the base station; the updating module 62 is configured to determine the first bit among the at least three bits as 0 and update an activation or deactivation state of the at least one secondary carrier according to the at least three bits.

The user equipment in this embodiment may be used to perform the technical solution in the method embodiment illustrated in FIG. 3, their implementation principles and technical effects are similar, and therefore not further details are provided herein.

Optionally, the first bit among the at least three bits included in the indication information is 0 or 1.

Optionally, the base station is a base station of the R9 version, and the user equipment is a user equipment of the R10 version or the R11 version.

Optionally, at least one bit except the first bit among the at least three bits corresponds to one secondary carrier; a bit corresponding to the secondary carrier is 1, which indicates activation of the secondary carrier, and the bit corresponding to the secondary carrier is 0, which indicates deactivation of the secondary carrier.

Optionally, the at least one secondary carrier includes at least one secondary uplink carrier or at least one secondary downlink carrier; and if at least two secondary carriers exist, the at least two secondary carriers include at least one secondary uplink carrier and at least one secondary downlink carrier.

The user equipment in this embodiment may be used to perform the technical solution in the method embodiment, their implementation principles and technical effects are similar, and therefore not further details are provided herein.

Figure 7:
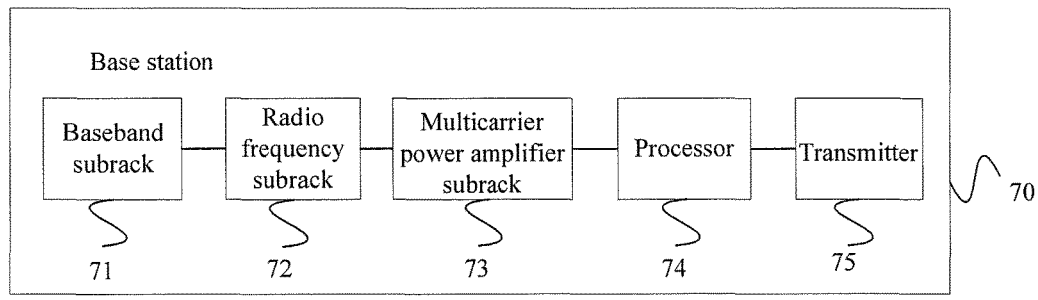
FIG. 7 is a schematic diagram of a base station according to a second embodiment of the present invention.

FIG. 7 is a schematic structural diagram of a base station according to a second embodiment of the present invention. As shown in FIG. 7, the base station 70 includes a baseband subrack 71, a radio frequency subrack 72, a multicarrier power amplifier subrack 73, a processor 74, and a transmitter 75. The baseband subrack 71 mainly processes dedicated and public channel to a UE, and it is formed by a radio network controller, a main processor cluster, and a network in asynchronous transfer mode. The radio frequency subrack 72 is formed by multiple radio frequency units and is capable of implementing digital/analog conversion, radio frequency signal modulation, and carrier synthesizing and splitting. The multicarrier power amplifier subrack 73 is configured to amplify power. The processor 74 is configured to determine to activate or deactivate at least one secondary carrier used to communicate with a user equipment; the transmitter 75 is configured to transmit a High Speed Shared Control Channel HS-SCCH order to the user equipment, where the HS-SCCH order carries indication information, the indication information includes at least three bits, the first bit is 0, and the indication information is used to indicate activation or deactivation of the at least one secondary carrier.

The base station in this embodiment may be used to perform the technical solution in the method embodiment illustrated in FIG. 1, their implementation principles and technical effects are similar, and therefore not further details are provided herein.

Optionally, the base station is a base station of the R9 version, and the user equipment is a user equipment of the R10 version or the R11 version.

Optionally, at least one bit except the first bit among the at least three bits corresponds to one secondary carrier; a bit corresponding to the secondary carrier is 1, which indicates activation of the secondary carrier, and the bit corresponding to the secondary carrier is 0, which indicates deactivation of the secondary carrier.

Optionally, the at least one secondary carrier includes at least one secondary uplink carrier or at least one secondary downlink carrier; and if at least two secondary carriers exist, the at least two secondary carriers include at least one secondary uplink carrier and at least one secondary downlink carrier.

The base station in this embodiment may be used to perform the technical solution in the method embodiment, their implementation principles and technical effects are similar, and therefore not further details are provided herein.

Figure 8:
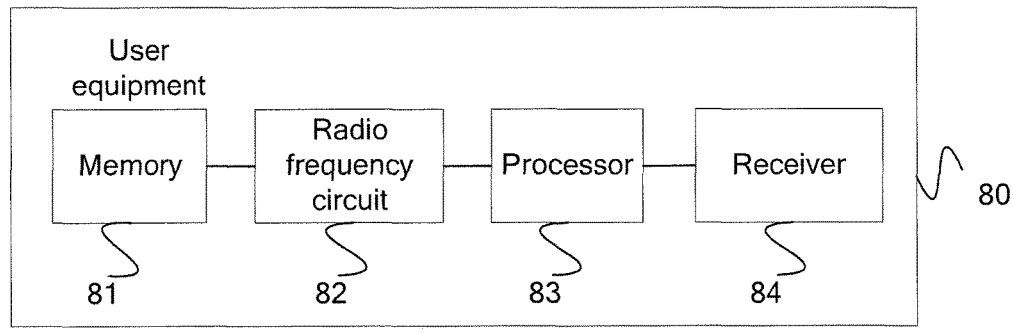
FIG. 8 is a schematic structural diagram of a user equipment according to a third embodiment of the present invention.

FIG. 8 is a schematic structural diagram of a user equipment according to a third embodiment of the present invention. As shown in FIG. 8, the user equipment 80 provided in this embodiment includes: at least one memory 81, at least one RF (Radio Frequency, radio frequency, RF for short) circuit 82, at least one processor 83, and at least one receiver 84. The memory 81 may include a high-speed random access memory, a non-volatile solid storage device, and the like; the radio frequency circuit 82 is configured to receive or transmit a baseband signal through an antenna; the processor 83 is configured to update an activation or deactivation state of at least one secondary carrier according to indication information; the receiver 84 is configured to receive a High Speed Shared Control Channel HS-SCCH order transmitted by a base station, where the HS-SCCH order carries the indication information, the indication information includes at least three bits, the first bit is 0, and the indication information is used to indicate activation or deactivation of the at least one secondary carrier for communication between the user equipment and the base station.

The user equipment in this embodiment may be used to perform the technical solution in the method embodiment illustrated in FIG. 2, their implementation principles and technical effects are similar, and therefore not further details are provided herein.

Optionally, the base station is a base station of the R9 version, and the user equipment is a user equipment of the R10 version or the R11 version.

Optionally, at least one bit except the first bit among the at least three bits corresponds to one secondary carrier; a bit corresponding to the secondary carrier is 1, which indicates activation of the secondary carrier, and the bit corresponding to the secondary carrier is 0, which indicates deactivation of the secondary carrier.

Optionally, the at least one secondary carrier includes at least one secondary uplink carrier or at least one secondary downlink carrier; and if at least two secondary carriers exist, the at least two secondary carriers include at least one secondary uplink carrier and at least one secondary downlink carrier.

The user equipment in this embodiment may be used to perform the technical solution in the method embodiment, their implementation principles and technical effects are similar, and therefore not further details are provided herein.

Figure 9:
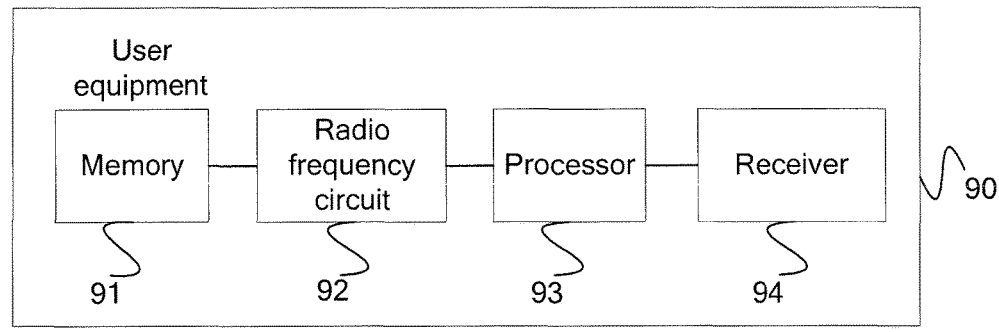
FIG. 9 is a schematic structural diagram of a user equipment according to a fourth embodiment of the present invention.

FIG. 9 is a schematic structural diagram of a user equipment according to a fourth embodiment of the present invention. As shown in FIG. 9, the user equipment 90 provided in this embodiment includes: at least one memory 91, at least one RF (Radio Frequency, radio frequency, RF for short) circuit 92, at least one processor 93, and a receiver 94. The memory 91 may include a high-speed random access memory, a non-volatile solid storage device, and the like; the radio frequency circuit 92 is configured to receive or transmit a baseband signal through an antenna; the processor 93 is configured to determine the first bit among the at least three bits as 0 and update activation or deactivation states of the at least two secondary carriers according to the at least three bits; the receiver 94 is configured to receive a High Speed Shared Control Channel HS-SCCH order transmitted by a base station, where the HS-SCCH order carries indication information, the indication information includes the at least three bits, and the indication information is used to indicate activation or deactivation of the at least one secondary carrier for communication between the user equipment and the base station.

The user equipment in this embodiment may be used to perform the technical solution in the method embodiment illustrated in FIG. 3, their implementation principles and technical effects are similar, and therefore not further details are provided herein.

Optionally, the first bit among the at least three bits included in the indication information is 0 or 1.

Optionally, the base station is a base station of the R9 version, and the user equipment is a user equipment of the R10 version or the R11 version.

Optionally, at least one bit except the first bit among the at least three bits corresponds to one secondary carrier; a bit corresponding to the secondary carrier is 1, which indicates activation of the secondary carrier, and the bit corresponding to the secondary carrier is 0, which indicates deactivation of the secondary carrier.

Optionally, the at least one secondary carrier includes at least one secondary uplink carrier or at least one secondary downlink carrier; and if at least two secondary carriers exist, the at least two secondary carriers include at least one secondary uplink carrier and at least one secondary downlink carrier.

The user equipment in this embodiment may be used to perform the technical solution in the method embodiment, their implementation principles and technical effects are similar, and therefore not further details are provided herein.

A person of ordinary skill in the art may understand that, all or a part of the steps of the foregoing method embodiments may be implemented by a program instructing relevant hardware. The foregoing programs may be stored in a computer readable storage medium. When the program runs, the steps of the forgoing method embodiments are performed. The foregoing storage medium includes various mediums capable of storing program codes, such as a ROM, a RAM, a magnetic disk, or an optical disc.

Finally, it should be noted that the foregoing embodiments are merely intended for describing the technical solutions of the present invention other than limiting the present invention. Although the present invention is described in detail with reference to the foregoing embodiments, a person of ordinary skill in the art should understand that he may still make modifications to the technical solutions described in the foregoing embodiments, or make equivalent replacements to some or all the technical features thereof, without departing from the scope of the technical solutions of the embodiments of the present invention.

What is claimed is:

1. A method for activating or deactivating a carrier, comprising:
   receiving, by a user equipment, a High Speed Shared Control Channel (HS-CCH) order transmitted from a base station, wherein the HS-SCCH order carries indication information, the indication information comprises three bits $x_{ord,1}$, $x_{ord,2}$, and $x_{ord,3}$, wherein $x_{ord,1}$ is 0 or 1, the indication information is used to indicate activation or deactivation of at least one secondary carrier for communication between the user equipment and the base station;
   determining, by the user equipment, $x_{ord,1}=0$ no matter whether the value of $x_{ord,1}$ in the received HS-SCCH order is 1 or 0,
   updating, by the user equipment, an activation or deactivation state of the at least one secondary carrier according to the determined $x_{ord,1}$, and the value of $x_{ord,2}$, and $x_{ord,3}$;
   wherein the updating an activation or deactivation state of the at least one secondary carrier according to the determined $x_{ord,1}$, and the value of $x_{ord,2}$, and $x_{ord,3}$, comprises:
   updating the activation or deactivation state of the at least one secondary carrier according to the three bits $x_{ord,1}$, $x_{ord,2}$, and $x_{ord,3}$ in the following table when an order type $x_{odt,1}$, $x_{odt,2}$, $x_{odt,3}$ in the table is 001,

| Order Type $x_{odt,1}$, $x_{odt,2}$, $x_{odt,3}$ | Order Mapping $x_{ord,1}$ | $x_{ord,2}$ | $x_{ord,3}$ | Functionality A = Activate; D = Deactivate | | | |
|---|---|---|---|---|---|---|---|
| | | | | 1st secondary downlink carrier | 2nd secondary downlink carrier | 3rd secondary downlink carrier | Secondary uplink carrier |
| 001 | 0 | 0 | 0 | D | D | D | D |
| | 0 | 0 | 1 | A | D | D | D |
| | 0 | 1 | 1 | A | D | D | A |
| | 0 | 1 | 0 | D | A | D | D |
| | 1 | 0 | 0 | A | A | D | D |
| | 1 | 0 | 1 | A | A | D | A |
| | 1 | 1 | 0 | D | D | A | D |
| | 1 | 1 | 1 | A | D | A | D |
| 010 | 0 | 0 | 0 | A | D | A | A |
| | 0 | 0 | 1 | D | A | A | D |
| | 0 | 1 | 0 | A | A | A | D |
| | 0 | 1 | 1 | A | A | A | A |
| | 1 | 0 | 0 | Reserved | | | |
| | 1 | 0 | 1 | Reserved | | | |
| | 1 | 1 | 0 | Reserved | | | |
| | 1 | 1 | 1 | Reserved. | | | |

2. The method according to claim 1, wherein the at least one secondary carrier comprises at least one secondary uplink carrier or at least one secondary downlink carrier.

3. The method according to claim 1, wherein in the received HS-SCCH order, $x_{ord,2}$ corresponds to a secondary uplink carrier and indicates activation or deactivation of the secondary uplink carrier, $x_{ord,3}$ corresponds to a secondary downlink carrier and indicates activation or deactivation of the secondary downlink carrier.

4. A user equipment, comprising:
   a receiver, configured to receive a High Speed Shared Control Channel (HS-SCCH) order transmitted by a base station, wherein the HS-SCCH order comprises three order bits for indicating activation or deactivation of a secondary uplink carrier and a secondary downlink carrier, the three order bits are $x_{ord,1}$, $x_{ord,2}$, and $x_{ord,3}$, $x_{ord,1}$ is 0 or 1;
   a processor, configured to determine $x_{ord,1}=0$ no matter whether the value of $x_{ord,1}$ in the received HS-SCCH order is 1 or 0, and to update an activation or deactivation state of the at least one secondary carrier according to the determined $x_{ord,1}$, and the value of $x_{ord,2}$, and $x_{ord,3}$;
   wherein the processor is configured to update the activation or deactivation state of the at least one secondary carrier according to the three bits $x_{ord,1}$, $x_{ord,2}$, and $x_{ord,3}$ in the following table when an order type $x_{odt,1}$, $x_{odt,2}$, $x_{odt,3}$ in the table is 001,

| Order Type $x_{odt,1}$, $x_{odt,2}$, $x_{odt,3}$ | Order Mapping $x_{ord,1}$ | $x_{ord,2}$ | $x_{ord,3}$ | Functionality A = Activate; D = Deactivate | | | |
|---|---|---|---|---|---|---|---|
| | | | | 1st secondary downlink carrier | 2nd secondary downlink carrier | 3rd secondary downlink carrier | Secondary uplink carrier |
| 001 | 0 | 0 | 0 | D | D | D | D |
| | 0 | 0 | 1 | A | D | D | D |
| | 0 | 1 | 1 | A | D | D | A |
| | 0 | 1 | 0 | D | A | D | D |
| | 1 | 0 | 0 | A | A | D | D |
| | 1 | 0 | 1 | A | A | D | A |
| | 1 | 1 | 0 | D | D | A | D |
| | 1 | 1 | 1 | A | D | A | D |

-continued

| Order Type $x_{odt,1}$, $x_{odt,2}$, $x_{odt,3}$ | Order Mapping $x_{ord,1}$ $x_{ord,2}$ $x_{ord,3}$ | | | Functionality A = Activate; D = Deactivate | | | |
|---|---|---|---|---|---|---|---|
| | | | | 1st secondary downlink carrier | 2nd secondary downlink carrier | 3rd secondary downlink carrier | Secondary uplink carrier |
| 010 | 0 | 0 | 0 | A | D | A | A |
|  | 0 | 0 | 1 | D | A | A | D |
|  | 0 | 1 | 0 | A | A | A | D |
|  | 0 | 1 | 1 | A | A | A | A |
|  | 1 | 0 | 0 | Reserved | | | |
|  | 1 | 0 | 1 | Reserved | | | |
|  | 1 | 1 | 0 | Reserved | | | |
|  | 1 | 1 | 1 | Reserved. | | | |

5. The user equipment according to claim 4, wherein the at least one secondary carrier comprises at least one secondary uplink carrier or at least one secondary downlink carrier.

6. The user equipment according to claim 4, wherein in the received HS-SCCH order, $x_{ord,2}$ corresponds to a secondary uplink carrier and indicates activation or deactivation of the secondary uplink carrier, $x_{ord,3}$ corresponds to a secondary downlink carrier and indicates activation or deactivation of the secondary downlink carrier.

7. A wireless communications system, comprising a base station and a user equipment, wherein the user equipment comprises:
   a receiver, configured to receive a High Speed Shared Control Channel (HS-SCCH) order transmitted by a base station, wherein the HS-SCCH order comprises three order bits for indicating activation or deactivation of a secondary uplink carrier and a secondary downlink carrier, the three order bits are $x_{ord,1}$, $x_{ord,2}$, and $x_{ord,3}$, $x_{ord,1}$ is 0 or 1;
   a processor, configured to determine $x_{ord,1}=0$ no matter whether the value of $x_{ord,1}$ in the received HS-SCCH order is 1 or 0, and to update an activation or deactivation state of the at least one secondary carrier according to the determined $x_{ord,1}$, and the value of $x_{ord,2}$ and $x_{ord,3}$;
   wherein the processor is configured to update the activation or deactivation state of the at least one secondary carrier according to the three bits $x_{ord,1}$, $x_{ord,2}$, and $x_{ord,3}$ in the following table when an order type $x_{odt,1}$, $x_{odt,2}$, $x_{odt,3}$ in the table is 001,

| Order Type $x_{odt,1}$, $x_{odt,2}$, $x_{odt,3}$ | Order Mapping $x_{ord,1}$ $x_{ord,2}$ $x_{ord,3}$ | | | Functionality A = Activate; D = Deactivate | | | |
|---|---|---|---|---|---|---|---|
| | | | | 1st secondary downlink carrier | 2nd secondary downlink carrier | 3rd secondary downlink carrier | Secondary uplink carrier |
| 001 | 0 | 0 | 0 | D | D | D | D |
|  | 0 | 0 | 1 | A | D | D | D |
|  | 0 | 1 | 1 | A | D | D | A |
|  | 0 | 1 | 0 | D | A | D | D |
|  | 1 | 0 | 0 | A | A | D | D |
|  | 1 | 0 | 1 | A | A | D | A |
|  | 1 | 1 | 0 | D | D | A | D |
|  | 1 | 1 | 1 | A | D | A | D |
| 010 | 0 | 0 | 0 | A | D | A | A |
|  | 0 | 0 | 1 | D | A | A | D |
|  | 0 | 1 | 0 | A | A | A | D |
|  | 0 | 1 | 1 | A | A | A | A |
|  | 1 | 0 | 0 | Reserved | | | |
|  | 1 | 0 | 1 | Reserved | | | |
|  | 1 | 1 | 0 | Reserved | | | |
|  | 1 | 1 | 1 | Reserved. | | | |

8. The wireless communications system according to claim 7, wherein the at least one secondary carrier comprises at least one secondary uplink carrier or at least one secondary downlink carrier.

9. The wireless communications system according to claim 7, wherein in the received HS-SCCH order, $x_{ord,2}$ corresponds to a secondary uplink carrier and indicates activation or deactivation of the secondary uplink carrier, $x_{ord,3}$ corresponds to a secondary downlink carrier and indicates activation or deactivation of the secondary downlink carrier.

10. A non-transitory computer program product comprising computer program code, which, when executed by a computer unit in a user equipment, will cause the user equipment to perform operations comprising:
   receiving a High Speed Shared Control Channel (HS-SCCH) order transmitted from a base station, wherein the HS-SCCH order carries indication information, the indication information comprises three bits $x_{ord,1}$, $x_{ord,2}$, and $x_{ord,3}$, wherein $x_{ord,1}$ is 0 or 1, the indication information is used to indicate activation or deactivation of at least one secondary carrier for communication between the user equipment and the base station;
   determining $x_{ord,1}=0$ no matter whether the value of $x_{ord,1}$ in the received HS-SCCH order is 1 or 0,
   updating an activation or deactivation state of the at least one secondary carrier according to the determined $x_{ord,1}$, and the value of $x_{ord,2}$ and $x_{ord,3}$;
   wherein the updating the activation or deactivation state of the at least one secondary carrier according to the determined $x_{ord,1}$, and the value of $x_{ord,2}$ and $x_{ord,3}$, comprises:
   updating, an activation or deactivation state of the at least one secondary carrier according to the three bits $x_{ord,1}$, $x_{ord,2}$, and $x_{ord,3}$ in the following table when an order type $x_{odt,1}$, $x_{odt,2}$, $x_{odt,3}$ in the table is 001,

| Order Type $x_{odt,1}$, $x_{odt,2}$, $x_{odt,3}$ | Order Mapping $x_{ord,1}$ $x_{ord,2}$ $x_{ord,3}$ | | | Functionality A = Activate; D = Deactivate | | | |
|---|---|---|---|---|---|---|---|
| | | | | 1st secondary downlink carrier | 2nd secondary downlink carrier | 3rd secondary downlink carrier | Secondary uplink carrier |
| 001 | 0 | 0 | 0 | D | D | D | D |
|  | 0 | 0 | 1 | A | D | D | D |
|  | 0 | 1 | 1 | A | D | D | A |
|  | 0 | 1 | 0 | D | A | D | D |
|  | 1 | 0 | 0 | A | A | D | D |
|  | 1 | 0 | 1 | A | A | D | A |

-continued

| Order Type $X_{odt,1}$, $X_{odt,2}$, $X_{odt,3}$ | | | Order Mapping | | Functionality A = Activate; D = Deactivate | | | |
|---|---|---|---|---|---|---|---|---|
| | $X_{ord,1}$ | $X_{ord,2}$ | $X_{ord,3}$ | 1st secondary downlink carrier | 2nd secondary downlink carrier | 3rd secondary downlink carrier | Secondary uplink carrier |
| | 1 | 1 | 0 | D | D | A | D |
| | 1 | 1 | 1 | A | D | A | D |
| 010 | 0 | 0 | 0 | A | D | A | A |
| | 0 | 0 | 1 | D | A | A | D |
| | 0 | 1 | 0 | A | A | A | D |
| | 0 | 1 | 1 | A | A | A | A |
| | 1 | 0 | 0 | | Reserved | | |
| | 1 | 0 | 1 | | Reserved | | |
| | 1 | 1 | 0 | | Reserved | | |
| | 1 | 1 | 1 | | Reserved. | | |

\* \* \* \* \*